United States Patent Office 2,885,375
Patented May 5, 1959

2,885,375

AIR-DRYING RESINOUS ESTER FROM PARTIAL ALLYL ETHER OF PENTAERYTHRITOL

Conrad J. Campbell, New Castle, Del., assignor to Hercules Powder Company, Wilmington, Del., a corporation of Delaware No Drawing. Application September 14, 1956
Serial No. 609,820

5 Claims. (Cl. 260—22)

The present invention relates to a new resinous ester, more particularly to a new resinous ester of the alkyd type which is particularly useful as a film-forming ingredient of coating compositions, and to a method of preparing the new resinous ester.

The manufacturer of coating compositions is continually faced with the demand for a product which meets many different quality specifications. The ideal coating composition, for example, should have a viscosity such that it can be easily applied by brushing or spraying. Once applied, the coating should dry rapidly to a smooth, even film sufficiently thick to provide a finished surface in no more than about three separate coats. Finally, the dry film should have good gloss and the ability to retain its gloss over a considerable period of time. The film furthermore should be resistant to chalking and resistant to embrittlement and discoloring upon aging.

The ideal coating composition has not yet been made. While certain coating compositions are outstanding in some respects, they are usually below average in other respects. Most coating compositions therefore are the results of a compromise to achieve an overall balance of average properties for a given use.

The problems facing the coatings manufacturer can be illustrated by the formulation of exterior house paints. For many years, the essential film-forming ingredient of most house paints has been a drying oil such as linseed oil. The drying oils have many properties which make them desirable for this purpose. For instance, they are relatively low in viscosity and from them it is possible to formulate paints containing a high percentage of drying oil with a minimum of volatile solvent. Such paints are easily applied, i.e., they have good brushing and leveling characteristics and they dry to films of desirable thickness. However, the drying time is generally longer than desirable and the films, when dry, are relatively low in gloss and poor in the ability to retain the gloss. The films also are prone to excessive chalking and lack resistance to staining, blistering, and to deterioration upon aging.

Attempts have been made to replace the drying oils with drying oil-modified alkyd resins. By this means it has been possible to improve the rate of drying, gloss, gloss retention, resistance to staining, blistering, and chalking, and resistance to deterioration upon aging. However, the higher viscosity of the alkyd resins in comparison to linseed oil has meant that these paints containing a desirable high content of film-forming ingredient tend to suffer from poor brushing and leveling characteristics. There thus exists a need for a film-forming ingredient which has the desirable qualities of both the drying oils and the drying oil-modified alkyds.

An object of this invention is to provide a novel resinous ester which is capable of air-drying to a smooth, glossy film of good durability and which is also characterized by a low viscosity so that coating compositions containing a relatively high concentration of the resinous ester can be prepared without sacrifice of brushing and leveling characteristics and other properties.

In accordance with the invention there is provided a resinous ester which is prepared by the reaction of ingredients including a partial allyl ether of pentaerythritol having at least two free hydroxyl groups, a fatty acid substance selected from the group consisting of drying fatty oils and drying fatty acids, and a dicarboxylic acid free from ethylenic and acetylenic unsaturation.

In order to illustrate the invention in greater detail the following examples are presented. Parts and percentages in the examples and elsewhere in the specification are by weight unless otherwise specified.

*Example 1*

Into a reaction vessel equipped with an agitator, thermometer, and inert gas inlet tube there was charged 1231 parts of alkali refined linseed oil. The linseed oil was then heated to 240° C. while being rapidly agitated in an atmosphere of carbon dioxide. While the oil was held at 240° C., there were added 0.29 part of sublimed litharge and 238 parts of a mixture of allyl ethers of commercial pentaerythritol which mixture had an average substitution of two allyl groups per molecule of pentaerythritol. The resulting mixture was reheated to 240° C. and held at this temperature for 40 minutes to form the alcoholic product. There was then added 148 parts of phthalic anhydride and the resulting mixture was heated to a temperature of 240–260° C. until an acid number of seven was reached. The final resinous ester when cooled had a Gardner-Holdt viscosity of I–J.

*Example 2*

Into a reaction vessel similar to that employed in Example 1 there was charged 610 parts of the resinous ester of Example 1 and 12.2 parts of fumaric acid. This mixture was heated to a temperature of 240–260° C. and held at that temperature for 45 minutes. The resulting resinous ester had an acid number of 20.5 and a Gardner-Holdt viscosity of T–U.

The resinous esters of Examples 1 and 2 were compared in drying ability to a commercial drying oil-modified glyceryl phthalate alkyd containing 77% linseed oil and having a Gardner-Holdt viscosity of W–Y. There was added to each of the resinous esters and to the commercial alkyd prior to testing 0.05% cobalt, as cobalt naphthenate, and 0.5% lead, as lead naphthenate. The results of the drying test are as follows:

| | Example 1 | Example 2 | Commercial Alkyd |
|---|---|---|---|
| Set to touch, Hours | 3.00 | 2.33 | 3.50 |
| Cotton Free, Hours | 3.16 | 2.33–3.00 | 4.33 |
| Hard, Hours | >6.5 | 5.33 | >6.5 |
| Aluminum Foil Free, Hours | >7.5 | >7.5 | >6.5 |
| After 24 hours, Film | Soft | Hard | Soft |
| Percent Sward Hardness | 2 | 6 | 4 |

*Example 3*

Into a reaction vessel of the type employed in Example 1 there was charged 1231 parts of alkali refined soybean oil which was heated to 240° C. with rapid agitation in an atmosphere of carbon dioxide. There was next added 0.29 part of sublimed litharge and 238 parts of the same partial allyl ether of pentaerythritol that was employed in Example 1. The resulting mixture was reheated to 240° C. and held 40 minutes. There was then added 133.2 parts of phthalic anhydride and reaction was continued at 240° C. until an acid number of 11 was reached. The resinous ester at this point had a Gardner-Holdt viscosity of D–E. There was next added 9.8 parts of maleic anhydride and reaction was continued at 250° C. to an acid number of 6.3. The viscosity of the final resinous ester was I–J.

Example 4

A resinous ester was prepared by the procedure of Example 3 with the exception that fumaric acid was substituted for maleic anhydride on an equivalent carboxyl basis. The resinous ester had an acid number of 6.7 and a Gardner-Holdt viscosity of J–K.

The resinous ester was next formulated into an exterior white house paint by conventional procedures. The formulation of the paint was as follows:

| Ingredient: | Parts |
| --- | --- |
| Titanium dioxide pigment | 200 |
| Asbestine | 356 |
| Resinous ester | 412 |
| Pb naphthenate | 2.5 |
| Co naphthenate | 0.14 |
| Phenyl mercuric oleate | 2.33 |
| Mineral spirits | 161 |

The house paint was brushed onto cedar panels whereby it was evident that the paint had excellent brushing and leveling characteristics which resulted in smooth and even coatings. Exterior exposure for one year showed the house paint to have gloss retention and resistance to deterioration far superior to that of an average linseed oil paint.

Example 5

Into a reaction vessel of the type employed in Example 1 there was charged 336 parts of segregated cottonseed fatty acids (iodine value 140), 381 parts of the partial allyl ether of pentaerythritol described in Example 1, and 148 parts of phthalic anhydride. The entire charge was heated to a temperature of 220–240° C. until an acid number of 18.3 was attained. The resulting resinous ester when cool had a Gardner-Holdt viscosity of T–U.

There was added to the resinous ester 0.05% cobalt, as cobalt naphthenate, and 0.5% lead, as lead naphthenate, based on the resinous ester. The drying characteristics and the properties of a film of the resinous ester were as follows:

| | Example 5 |
| --- | --- |
| After 0.25 hour | Not set to touch. |
| After 1.0 hour | Still oily. |
| After 3.0 hours | Almost set to touch. |
| After 6.0 hours | Heavy tack. |
| After 18.0 hours: | |
| Aluminum foil free | Yes. |
| Hardness | Very good. |
| Adhesion | Good. |
| Toughness | Good. |

The low viscosity and very satisfactory drying rate of this resinous ester evidences its utility as an ingredient of exterior paints.

Example 6

A portion of the resinous ester prepared in Example 5 amounting to 133 parts was charged along with 183 parts of xylene to a reaction vessel equipped with a stirrer and reflux condenser. The resulting solution was heated to the reflux temperature and there was added over a period of two hours 57 parts of styrene in which was dissolved 1.7 parts of ditertiary butyl peroxide. Refluxing was continued for an additional 4¼ hours, 2.7 additional parts of ditertiary butyl peroxide was added, and refluxing continued for an additional four hours. The final product had an acid number of 15.8 and a Gardner-Holdt viscosity of less than A as a 50% solution in xylene.

To a 50% solution of the resinous ester in xylene there was added 0.05% cobalt, as cobalt naphthenate, and 0.5% lead, as lead naphthenate, based on the resinous ester, and 0.5 mil films of this solution were cast on glass plates. The drying characteristics and film characteristics are as follows:

| | Example 6 |
| --- | --- |
| After 0.25 hour | Set to touch. |
| After 1.0 hour | Cotton free. |
| After 3.0 hours | Aluminum foil free. |
| After 6.0 hours | |
| After 18.0 hours: | |
| Aluminum foil free | Yes. |
| Hardness | Very good. |
| Adhesion | Good. |
| Toughness | Good. |

The rapid drying ability of the resinous ester is apparent, thus indicating its usefulness in coatings which are required to meet fast dry schedules.

Example 7

Into a reaction vessel equipped with reflux condenser and agitator there was placed 364 parts of segregated cottonseed fatty acids (iodine value 140), 81.4 parts of the partial allyl ether of pentaerythritol described in Example 1, 87.5 parts of pentaerythritol, 100 parts of phthalic anhydride, and 5.7 parts of maleic anhydride. The resulting mixture was heated to about 150° C. and there was added at this point 75.5 parts of pentaerythritol and approximately 16.8 parts of xylene. The reaction temperature was raised to 250° C. and held at this temperature until an acid number of 5.3 was reached. The resulting resinous ester was cut in the reaction flask with mineral spirits to 60% solvents. The 60% solution of ester had a Gardner-Holdt viscosity of A.

There was added to the resulting solution 0.5% cobalt, as cobalt naphthenate, and 0.5% lead, as lead naphthenate, based on the resinous ester. The drying characteristics and film characteristics of a 0.5 mil film of the solution were as follows:

| | Example 7 |
| --- | --- |
| Set | 2 hrs. 15 min. |
| Cotton free | 2 hrs. 30 min. |
| Firm | 5 hrs. 30 min. |
| Aluminum foil free | 8 hrs. |
| After 24 hours: | |
| Tack | None. |
| Sward hardness | 4. |
| After 48 hours: | |
| Sward hardness | 6. |

As above described, the resinous ester of the invention is prepared by the reaction of ingredients including a partial allyl ether of pentaerythritol having at least two free hydroxyl groups, a dicarboxylic acid free from acyclic unsaturation, and a fatty acid substance selected from the group consisting of drying fatty oils and drying fatty acids. Although other ingredients may be included in the preparation of the resinous ester, as will be explained, the above-named ingredients are the essential ingredients and should comprise at least about 85% of the total reactants in order to achieve the desirable properties which characterize the resinous esters of the invention.

As among the essential ingredients, reaction occurs between the hydroxyl groups of the partial allyl ether of pentaerythritol and the carboxyl groups of the other components. In accordance with the practices of the art in preparing related resinous esters, the proportion of ingredients should be such as to provide an approximate equivalence of hydroxyl and carboxyl groups with preferably a slight excess of the former.

The partial allyl ether of pentaerythritol having at least two free hydroxyl groups which is employed as an essential ingredient of the resinous ester can be prepared by methods known to the art as, for example, by the reaction of allyl bromide and pentaerythritol in an alkaline medium. As ordinarily prepared, the partial ether is a mixture of ethers of varying degrees of substitution. Thus a mixture of mono-, di-, tri- and tetra-allylethers of pentaerythritol which mixture has an average substitution of two allyl groups per molecule of pentaerythritol is commonly referred to as the diallyl ether of pentaerythritol. The invention therefore includes not only the use of essentially pure mono- and di-allyl ethers of pentaerythritol but also mixtures of ethers which average two or less allyl groups per molecule of pentaerythritol. Optimum results are obtained by the use of an allyl ether of pentaerythritol containing approximately two free hydroxyl groups.

The amount of drying fatty acid substance employed in making the resinous ester can be varied within fairly wide limits, i.e., from about 35% to about 90% of the total reactants. In the case where a drying fatty oil, or a mixture of drying fatty oil and drying fatty acid, is used in making the resinous ester, it will be understood that the fatty acid equivalent of the fatty oil is to be used to determine the drying fatty acid content of the resinous ester. The drying fatty acid equivalent is the theoretical amount of drying fatty acids which are furnished by the drying fatty oil.

The drying fatty oils and acids which can be used are well known in the art and include oils such as cottonseed oil, linseed oil, oiticica oil, perilla oil, poppyseed oil, safflower oil, soybean oil, tung oil, and the acids which are derivable therefrom by hydrolysis or equivalent means.

The dicarboxylic acid free from ethylenic and acetylenic unsaturation can be any of those acids of this description which are employed in the alkyd resin art. The dicarboxylic acid is preferably phthalic acid (or anhydride) because this acid provides coatings of considerable hardness. Terephthalic acid and isophthalic acid are also useful. Where lesser hardness is acceptable, the dicarboxylic acid can be an acid such as succinic, adipic, azelaic, sebacic, or the like. The above acids are in the class of alkylene and arylene dicarboxylic acids. As common in the art, the alkyl esters of all such acids can be used as reactants.

The amount of dicarboxylic acid can be fairly widely varied. In general, it is preferred that it constitute from about 10% to about 20% of the total reactants.

The resinous ester of the invention can be further modified by the addition of other acidic or alcoholic reactants in amounts which do not detract from the basic and novel characteristics of the ester. For example, there can be included among the reactants minor amounts of polyhydric alcohols such as pentaerythritol, glycerol, ethylene glycol, propylene glycol, dipentaerythritol, sorbitol, and the like or minor amounts of nonvolatile monohydric alcohols such as tetrahydroabietyl alcohol, etc. Similarly, there can be included as reactants minor amounts of unsaturated dicarboxylic acids such as maleic acid and fumaric acid as well as minor amounts of nondrying saturated and unsaturated monocarboxylic acids as exemplified by abietic acid, dehydroabietic acid, and stearic acid.

The resinous esters of the invention can be further modified by styrenation according to methods well known in the art to further improve its rate of drying without too great an increase in viscosity and without sacrifice of other properties.

In preparing the resinous esters of the invention there are in general three methods which may be employed. In the preferred method for use when the fatty acid substance is a drying fatty oil, the oil is alcoholized preferably at a temperature from about 230° to 250° C. by reaction with the partial allyl ether of pentaerythritol. The next step involves reaction of the alcoholized oil with the dicarboxylic acid until a product having the desired acid number is obtained. The reaction temperatures for the second step are preferably from about 220° to 260° C.

A second general method of preparing the resinous esters involves reacting all ingredients simultaneously at a temperature from about 220° to 260° C.

The third general method involves the preliminary reaction of the partial allyl ether of pentaerythritol with the dicarboxylic acid to a predetermined acid number at a temperature preferably from about 180° to 210° C. This step is followed by reaction of the preliminary ester with the drying fatty oil or the drying fatty acid until the desired final acid number is reached.

In general, the resinous ester of the invention has an acid number of less than 50 and is characterized by a viscosity considerably lower than the drying oil-modified glyceryl phthalate alkyds of the prior art but yet retains the ability to dry rapidly and to form glossy, durable films. These characteristics suggest the employment of the resinous ester as an ingredient of many different types of coating compositions, especially in instances where a relatively high concentration of film-former is desirable.

The compatibility of the resinous ester with such other film-forming ingredients as chlorinated rubber, polyvinyl acetate and nitrocellulose makes the resinous ester useful as a modifier in coating compositions based on these film-formers. It is also useful as the sole film-forming ingredient, as has been shown, in coating compositions generally.

In making coating compositions the resinous ester is easily blended with other conventional ingredients of such compositions, e.g., plasticizers, pigments, dyes, fillers, etc. As in the case of related resinous esters it is preferable also to include one or more conventional driers such as the cobalt and lead salts of linoleic and naphthenic acids.

Although emphasis has been placed on the air-drying characteristics of the resinous ester, it can also be dried by heating at elevated temperatures for various lengths of time with and without peroxide catalysts. The particular times and temperatures of heating required to produce finished coatings are interrelated and are also dependent on other factors such as the composition of the ester and the concentration and type of drier.

What I claim and desire to protect by Letters Patent is:

1. An air-drying resinous ester having an acid number less than 50 prepared by the esterification of ingredients consisting essentially of a partial allyl ether of pentaerythritol having at least two free hydroxyl groups per molecule, a fatty acid substance selected from the group consisting of drying fatty oils and drying fatty acids, and a dicarboxylic acid selected from the group consisting of phthalic acid, isophthalic acid, terephthalic acid, succinic acid, adipic acid, azelaic acid and sebacic acid, the proportion of said ingredients being such as to provide an approximate stoichiometric equivalence of hydroxyl and carboxyl groups.

2. The resinous ester of claim 1 in which the partial allyl ether of pentaerythritol has approximately two free hydroxyl groups per molecule.

3. An air-drying resinous ester having an acid number of less than 50 prepared by the esterification of ingredients consisting essentially of a partial allyl ether of pentaerythritol having at least two free hydroxyl groups, a drying fatty oil, and phthalic acid, the proportion of said ingredients being such as to provide an approximate stoichiometric equivalence of hydroxyl and carboxyl groups.

4. An air-drying resinous ester having an acid number of less than 50 prepared by the esterification of ingredients consisting essentially of a partial allyl ether of pentaerythritol having at least two free hydroxyl groups, a drying fatty acid, and phthalic acid, the proportion of said ingredients being such as to provide an approximate stoichiometric equivalence of hydroxyl and carboxyl groups.

5. A resinous ester according to claim 1 in which the named ingredients constitute at least about 85% of the total reactants.

References Cited in the file of this patent

UNITED STATES PATENTS

| | | |
|---|---|---|
| 2,315,708 | Hovey | Apr. 6, 1943 |
| 2,345,528 | Bradley | Mar. 28, 1944 |
| 2,631,986 | Schmutzler | Mar. 17, 1953 |